(No Model.)
T. B. ELLIOTT.
HAY AND GRAIN DERRICK AND CARRIER.
No. 314,321. Patented Mar. 24, 1885.
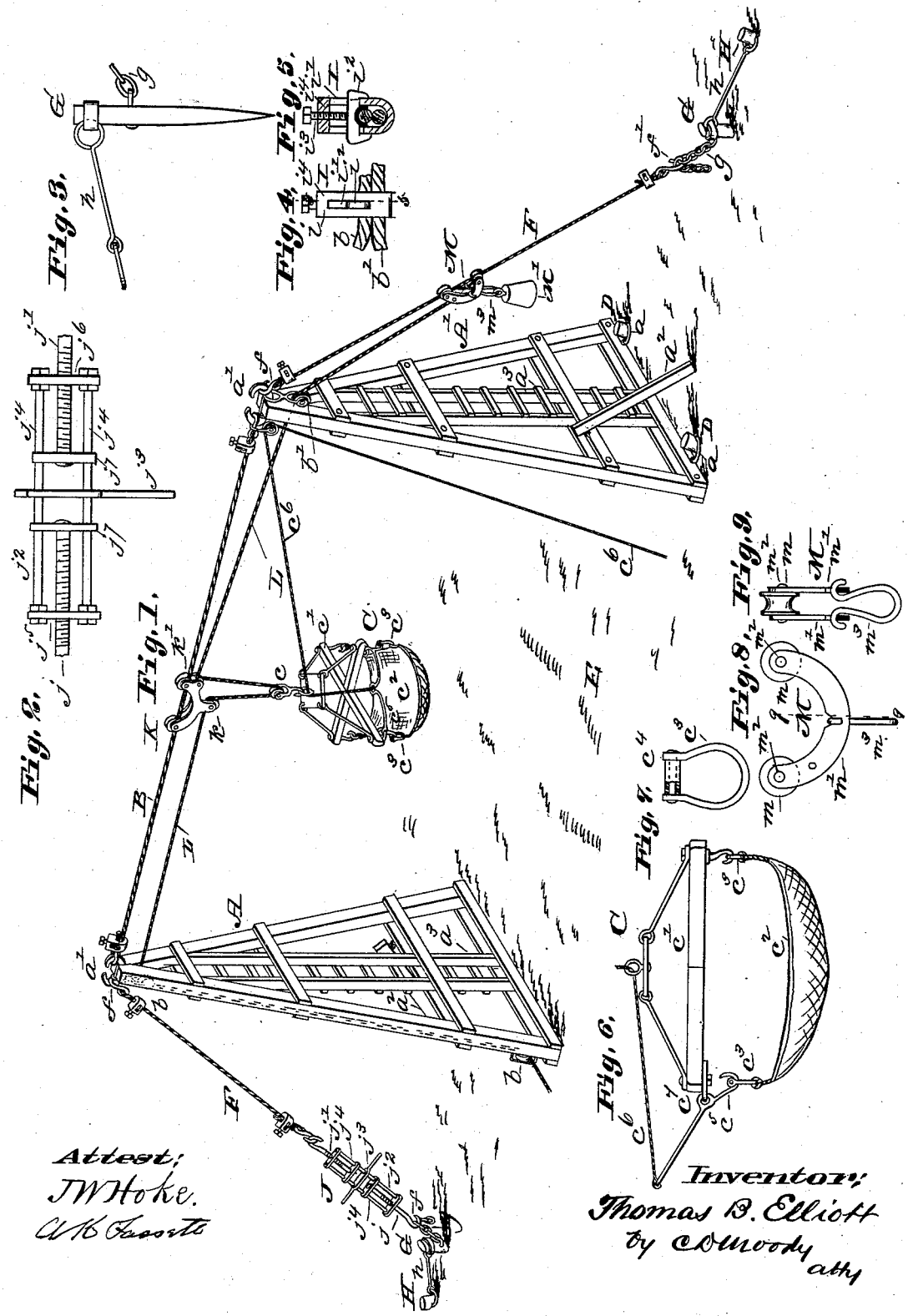

UNITED STATES PATENT OFFICE.

THOMAS B. ELLIOTT, OF KEMPER, ILLINOIS.

HAY AND GRAIN DERRICK AND CARRIER.

SPECIFICATION forming part of Letters Patent No. 314,321, dated March 24, 1885.

Application filed January 3, 1885. (No model.)

*To all whom it may concern:*

Be it known that I, THOMAS B. ELLIOTT, of Kemper, Jersey county, Illinois, have made a new and useful Improvement in Hay and Grain Derricks and Carriers, of which the following is a full, clear, and exact description.

The improvement relates, mainly, to that form of hay and grain derricks and carriers in which the carrier is suspended from a rope stretched between two uprights.

The annexed drawings, making part of this specification, illustrate the improvement.

Figure 1 is a view in perspective thereof. Fig. 2 is a side view of the swivel. Fig. 3 is a side elevation of one of the pins used in holding the upright in position. Fig. 4 is a side view of the device used in fastening a rope end. Fig. 5 is a section on the line 5 5 of Fig. 4. Fig. 6 is a side elevation of the carrier. Fig. 7 is a side elevation, partly in section, of the ring upon the carrier and with which the detaching-hook engages. Fig. 8 is a side elevation of the traveler, and Fig. 9 is a vertical section on the line 9 9 of Fig. 8.

The same letters of reference denote the same parts.

A A' represent the two uprights which support the rope B from which the carrier C is suspended. The upright at its base is held in place by the pins D D, which are driven through the rings $a$ $a$ (upon the upright) into the ground E, and at its top the upright is held by the tie F, which is generally a rope, and which—say by means of the hook $f$ engaging in the hook $a'$ upon the upright—is connected with the upper end of the upright, and leads thence to the pin G, the tie being connected with the pin by means of its hook $f'$ engaging with the chain $g$ of the pin. The pin G is driven into the ground, and it in turn is more effectually secured in the ground and so as to better withstand the strain of the tie F, by means of the pin H, which is driven into the ground in rear of the pin G, and to which it is attached by means of the tie $h$, which leads from the pin H to the pin G, and connecting therewith preferably at a point above that at which the chain $g$ is connected with the pin G.

The various ends of the ropes B F F are conveniently fastened by means of the device I, Figs. 4 and 5. The rope end $b$, after passing through the eye of the hook $f$, is carried back upon the main part $b'$ of the rope, and is clamped thereto by means of the device I, which is essentially a clamp consisting of the frame $i$, slotted in its sides at $i'$ $i'$, to receive the cross-bar $i^2$, and which cross-bar is adapted to be forced against the rope end and so as to bind it upon the main part of the rope by means of the screw $i^3$, which works through the outer end, $i^4$, of the clamp.

The ropes B and F F are tightened and the upright steadied in position by means of the swivel J, Figs. 1, 2. This swivel can be introduced into or made part of either or both of the ties F F. It consists, substantially, of the two threaded rods $j$ $j'$, (whose threads run in opposite directions,) the frame $j^2$, and the hand-bar $j^3$. The frame consists, mainly, of the side bars, $j^4$ $j^4$, and the cross-bars $j^5$ $j^6$. The cross-bars engage, respectively, with the rods $j$ $j'$, and the hand-bar is attached to the side bars, $j^4$ $j^4$. By means of the hand-bar the frame $j^2$ can be turned upon the rods $j$ $j'$, and the rods thereby drawn together or opened apart from each other. To steady the inner ends of the rods $j$ $j'$ as they are worked into the frame, additional cross-bars $j'$ $j'$, not threaded, may be attached loosely to the rods and side bars, $j^4$ $j^4$.

The uprights A A' may be supplied with the brace $a^2$, which is useful in supporting the upright as it is being set up and taken down. A ladder, $a^3$, leading upward therein, may also be embodied in the upright.

K represents the traveler, which is adapted to be moved forward and backward upon the rope B, between the uprights A A', and which, with the rope L, is the means for suspending the carrier C from the rope B. The rope B passes upward around suitable sheaves, $b$, upon the upright A, and thence around the sheave $k$ of the traveler K, thence around the sheave $e$ of the carrier, thence around the sheave $k'$ of the traveler, thence around a sheave, $b'$, on the upright A', and thence to a traveler, M, which, by means of the sheaves $m$ $m$, Figs. 8, 9, is adapted to travel upward and downward upon the tie F. The traveler M carries a weight, M', or is otherwise made sufficiently heavy to cause the rope L to draw the traveler K and the carrier C toward the upright A' whenever the end $l$ of the rope L is loosened—that is, the weighted traveler M serves to move the carrier in one direction, and by drawing the end $l$ of the rope L the carrier is moved in the opposite direction. When the carrier moves toward the upright A', the traveler M moves downward on the tie F, and when the carrier moves toward the upright A the traveler M moves upward on the tie F. The traveler M is preferably made of the two side bars, $m'\,m'$, the sheaves $m\,m$, and the sheave-shafts $m^2\,m^2$. The weight M' is conveniently attached to the traveler by means of the double hook $m^3$.

The carrier C consists, mainly, of the frame $c'$ and the canvas $c^2$, and, generally considered, the carrier is similar to the carrier shown in a pending application for Letters Patent. The peculiarity of the present carrier consists in providing the eyes $c^3\,c^3$ of the canvas $c^2$ with a roller, $c^4$, Fig. 7, by means of which the detaching-hook $c^5$ can be more readily unhooked from the eyes $c^3\,c^3$. The detaching-hook is operated by means of the rope $c^6$, and it is adapted to be tilted on the bearing $c^7$.

I claim—

1. The combination of the uprights A A', the ties F F, the rope B, the pins G G, and the pins H H, substantially as described.

2. The combination of the pin G, the pin H, and the tie $h$, as and for the purpose described.

3. The combination of the end $b$, the part $b'$, the hook-eye, and the clamp I, consisting of the frame $i$, the cross-bar $i^2$, and the screw $i^3$, substantially as described.

4. The combination of the threaded rods $j\,j'$, the frame $j^2$, and the hand-bar $j^3$, substantially as described.

5. The combination of the swivel J, the pins G G, the ties F F, the rope B, and the uprights A A', substantially as described.

6. The upright A, having the ladder $a^3$ embodied in it, substantially as described.

7. The combination of the uprights A A', the pins G G, the rope B, the ties F F, the rope L, the carrier C, and the weighted traveler M, substantially as described.

8. The combination of the upright A', the tie F, the pin G, the rope L, and the weighted traveler M, said upright being tied in the opposite direction to that of the tie F, substantially as described.

9. The combination of the upright A', the tie F, and the traveler M, consisting of the side bars, $m'\,m'$, the sheaves $m\,m$, the hook $m^3$, and the weight M', substantially as described.

10. The combination of the frame $c'$, the canvas $c^2$, the eyes $c^3\,c^3$, having the roller $c^4$ and the tilting-hook $c^5$, substantially as described.

THOMAS B. ELLIOTT.

Witnesses:
C. D. MOODY,
JOHN ROBINGS.